United States Patent
Li et al.

(10) Patent No.: US 11,206,765 B2
(45) Date of Patent: Dec. 28, 2021

(54) LED PLANT GROWTH LAMP SPECTRUM

(71) Applicant: FUJIAN SANAN SINO-SCIENCE PHOTOBIOTECH CO., LTD., Quanzhou (CN)

(72) Inventors: Yang Li, Quanzhou (CN); Guojie Liu, Quanzhou (CN); Jian Ma, Quanzhou (CN); Qiushi Ning, Quanzhou (CN); Hengsheng Chen, Quanzhou (CN); Linping Meng, Quanzhou (CN); Zhi Wang, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 106 days.

(21) Appl. No.: 16/604,163

(22) PCT Filed: Apr. 10, 2019

(86) PCT No.: PCT/CN2019/082028
§ 371 (c)(1),
(2) Date: Oct. 10, 2019

(87) PCT Pub. No.: WO2020/164179
PCT Pub. Date: Aug. 20, 2020

(65) Prior Publication Data
US 2021/0219497 A1    Jul. 22, 2021

(30) Foreign Application Priority Data

Feb. 15, 2019  (CN) .................. 201910117768.X
Apr. 9, 2019  (CN) .................. 201910281660.4

(51) Int. Cl.
*A01G 7/04* (2006.01)
*F21K 9/20* (2016.01)
(Continued)

(52) U.S. Cl.
CPC .............. *A01G 7/045* (2013.01); *F21K 9/20* (2016.08); *F21V 9/45* (2018.02); *F21Y 2115/10* (2016.08)

(58) Field of Classification Search
CPC .. A01G 7/045; A01G 7/04; F21K 9/20; F21V 9/45; F21V 9/40; F21Y 2115/10; Y02P 60/14
See application file for complete search history.

(56) References Cited

U.S. PATENT DOCUMENTS 10,165,735 B1   1/2019 Carlie et al.
2017/0035002 A1  2/2017 Ellins et al.
(Continued)

FOREIGN PATENT DOCUMENTS

CN    106718183 A   *   5/2017
CN    106900505 A   *   6/2017
(Continued)

OTHER PUBLICATIONS

Machine English Translation of CN106900505A; Wang TingTing (Year: 2017).*
(Continued)

*Primary Examiner* — Britt D Hanley
*Assistant Examiner* — Glenn D Zimmerman
(74) *Attorney, Agent, or Firm* — Dragon Sun Law Firm, PC; Jinggao Li, Esq.

(57) ABSTRACT

An LED plant growth lamp spectrum, the spectrum including: a light wave of 500-599 nm and a light wave of 700-780 nm, where a ratio of the number of photons in the range of 500-599 nm to the number of photons in the range of 700-780 nm is 0.9-1.6:1. The LED plant growth lamp spectrum promotes indoor cultivation and growth of plants, and helps to increase the yield of medicinal components per unit area and per unit time in the factory production.

11 Claims, 4 Drawing Sheets

(51) Int. Cl.
  *F21V 9/45*      (2018.01)
  *F21Y 115/10*    (2016.01)

(56)         References Cited

U.S. PATENT DOCUMENTS

2017/0035008 A1    2/2017  Ellins et al.
2017/0181241 A1*   6/2017  Koo ........................ H05B 45/22
2018/0332685 A1*  11/2018  Dai ......................... A01G 7/045
2019/0150247 A1*   5/2019  Eisele ................ F21V 23/0442
                                                      47/58.1 LS
2019/0223386 A1*   7/2019  Limpert ................ A61M 21/02

FOREIGN PATENT DOCUMENTS

CN        106900505 A      6/2017
CN        107543038 A      1/2018
CN        107614973 A      1/2018
CN        108055734 A      5/2018
WO     WO-2017192566 A1 *  11/2017   ........... H05B 47/105

OTHER PUBLICATIONS

Machine English Translation of CN106718183; Pei Kequan; (Year: 2017).*
Abstract of CN-106718183-A; Pei Kequan (Year: 2017).*

* cited by examiner

LED PLANT GROWTH LAMP SPECTRUM

CROSS REFERENCE TO THE RELATED APPLICATIONS

This application is the national phase entry of International Application No. PCT/CN2019/082028, filed on Apr. 10, 2019, which is based upon and claims priority to Chinese Patent Application No. 201910117768.X, filed on Feb. 15, 2019, and Chinese Patent Application No. 201910281660.4, filed on Apr. 9, 2019, the entire contents of which are incorporated herein by reference.

TECHNICAL FIELD

The present invention relates to a plant growth light, and in particular, to an LED plant growth lamp spectrum.

BACKGROUND

Cannabis products have been taken in various forms for thousands of years. The first description of medical use was in the Chinese herbal text of the first century AD. Cannabis products are orally administered in herbal tea blends and are used due to the properties of pain relief and sleep induction. The effective medicinal components of cannabinoid secondary metabolites are mainly tetrahydrocannabinol acid (THCa), cannabidiol acid (CBDa), cannabinol acid (CBNa), cannabichromene acid (CBCa), tetrahydrocannabinol (THC), cannabinol (CBN), cannabidiol (CBD), or cannabichromene (CBC), etc. The high-efficiency medicinal components are THC, CBN, CBC, and CBD. CBD exerts analgesic and anti-inflammatory effects through dual inhibition of cyclooxygenase and lipoxygenase, and has anti-epileptic, anti-psychotic, anti-depressant, analgesic effects, etc. THC can regulate an immune system, eliminate inflammation, stimulate appetite, and has a calming effect. In addition, the THC can be used as a potential drug for the treatment of cancer, and has a broad space for the development and research of its medicinal value. Therefore, a cannabis cultivation technology which obtains a high content of medicinal components has an important application value.

The ecological factors in indoor cultivation of cannabis, such as light, temperature, humidity and nutrition required for growth are highly stable. Therefore, it is possible to obtain plant raw materials with stable content of medicinal ingredients and stable yield. Moreover, it can be planted multiple times throughout the year without seasonal effect. At present, a high pressure sodium lamp (EPS), a metal halide lamp (MR) and an LED lamp are mainly used to provide a light environment for indoor cultivation of cannabis. Because of the limitations in the spectral design of the EPS and the MH, the achievable spectral energy distribution is limited. Due to the characteristics of narrow spectrum and flexible spectral design, the LED lamp has been widely studied. However, combining LED spectral regulation technology, a solution, which promotes indoor cultivation and growth of cannabis to achieve a better effect of promoting secondary metabolism of cannabis, has not been disclosed.

SUMMARY

In view of the above deficiencies of the prior art, the technical problem to be solved by the present invention is to provide an LED plant growth lamp spectrum, which promotes indoor cultivation and growth of plants, and helps to increase the yield of medicinal components per unit area and per unit time in the factory production.

A specific technical solution adopted by the present invention is as follows:

An LED plant growth lamp spectrum, including: a light wave of 500-599 nm and a light wave of 700-780 nm, a ratio of the number of photons in the range of 500-599 nm to the number of photons in the range of 700-780 nm being 0.9-1.6:1.

In order to better implement the present invention, a peak wavelength is in the range of 510-526 nm in a band of 500-550 nm.

In order to better implement the present invention, the spectrum further includes: a light wave of 600-699 nm and a light wave of 400-499 nm.

In order to better implement the present invention, a full-width-at-half-maximum of a corresponding peak light wave in the band of 500-550 nm is less than 50 nm.

In order to better implement the present invention, in the spectrum, photons in a band of 500-599 account for 18-26% of all spectral photons.

In order to better implement the present invention, a ratio of the number of photons in a band of 600-699 nm to the number of photons in a band of 400-499 nm is 3.8-4.8:1.

Correspondingly, the present invention also provides an LED plant growth lamp, a spectrum of the LED plant growth lamp being proportioned using the above method.

The present invention also provides use of the above LED plant growth lamp, in particular, use thereof in indoor cannabis cultivation.

In order to better implement the present invention, during the growth of cannabis, the LED plant growth lamp has a light intensity of 200 μmol/m²s to 1000 μmol/m²s and a light period of not higher than 15 h/d.

In order to better implement the present invention, a light source is implemented directly by an LED chip or by using the LED chip to excite a phosphor material.

Compared with the prior art, the present invention has the following beneficial effects:

1. The LED plant growth lamp provided by the present invention can replace a high pressure sodium lamp, meets the needs of a growing light environment of cannabis indoor cultivation, and is more energy-saving.

2. Compared with the high pressure sodium lamp (HIPS), the LED plant growth lamp provided by the present invention can increase the THC content in cannabis by 44-52%.

DETAILED DESCRIPTION OF THE EMBODIMENTS

The present invention is further described in detail below with reference to the embodiments, but the implementation of the present invention is not limited thereto. Various alternatives and modifications made according to the ordinary skill and conventional means in the art without departing from the technical spirit of the present invention should be included in the scope of the present invention.

Embodiment 1

Figure 1:
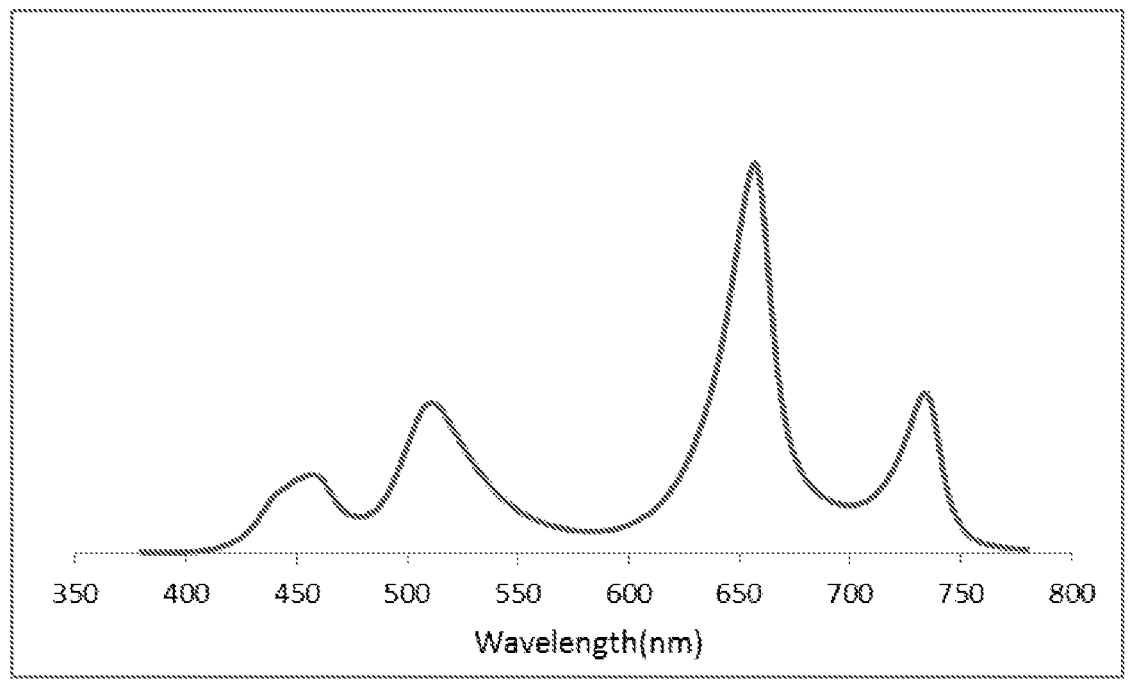
FIG. 1 is a spectral distribution diagram of an LED plant growth lamp used in Embodiment 1.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 1 is a spectral distribution diagram of the used LED plant growth lamp, where the light intensity was 200 μmol/$m^2$s to 1000 μmol/$m^2$s, the light period was 14 h, the spectral composition was: 18.2% of a light wave of 500-599 nm, 20.2% of a light wave of 700-780 nm, 50.4% of a light wave of 600-699 nm, and 11.2% of 400-499 nm, a peak wavelength was 510 nm in a band of 500-550 nm, and a full-width-at-half-maximum of a peak light wave was 29 nm.

Embodiment 2

Figure 2:
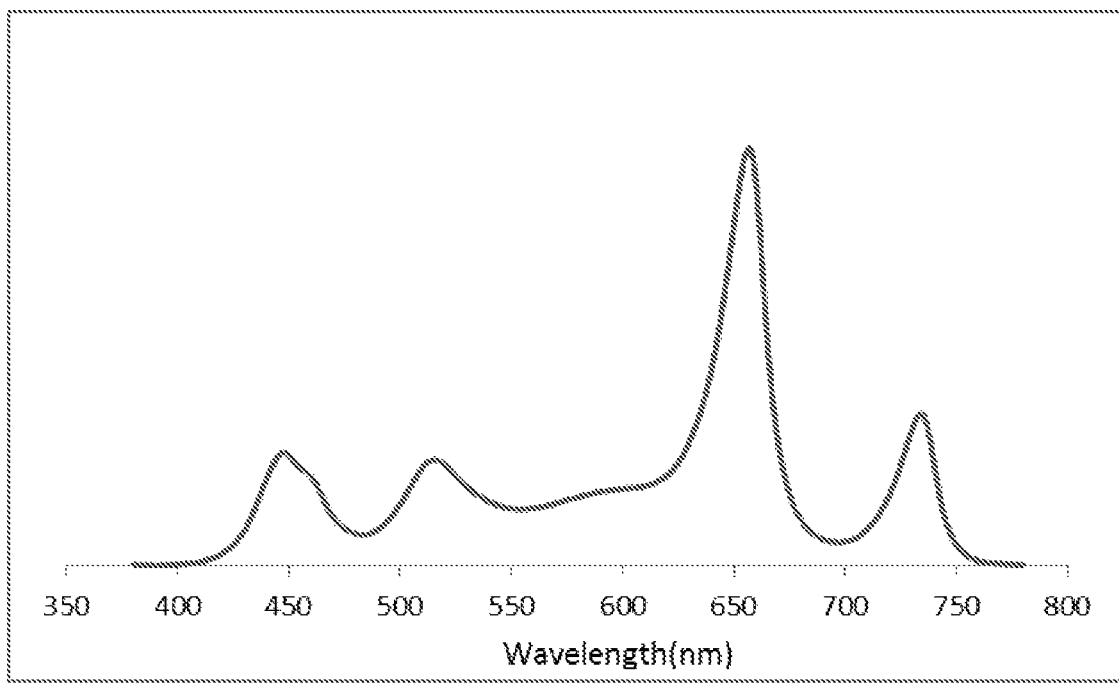
FIG. 2 is a spectral distribution diagram of an LED plant growth lamp used in Embodiment 2.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 2 is a spectral distribution diagram of the used LED plant growth lamp, where the light intensity was 200 μmol/$m^2$s to 1000 μmol/$m^2$s, the light period was 14 h, the spectral composition was: 21.7% of a light wave of 500-599 nm, 16.7% of a light wave of 700-780 nm, 49.8% of a light wave of 600-699 nm, and 11.8% of 400-499 nm, a peak wavelength was 515 nm in a band of 500-550 nm, and a full-width-at-half-maximum of a peak light wave was 34 nm.

Embodiment 3

Figure 3:
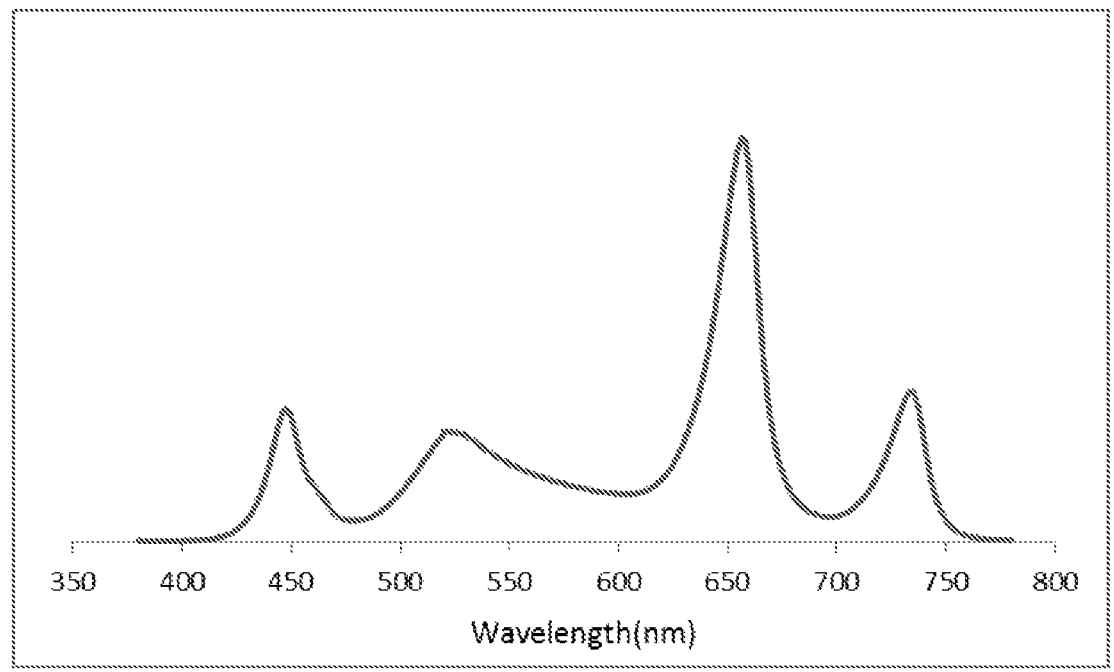
FIG. 3 is a spectral distribution diagram of an LED plant growth lamp used in Embodiment 3.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 3 is a spectral distribution diagram of the used LED plant growth lamp, where the light intensity was 200 μmol/$m^2$s to 1000 μmol/$m^2$s, the light period was 14 h, the spectral composition was: 23.6% of a light wave of 500-599 nm, 16.9% of a light wave of 700-780 nm, 49.1% of a light wave of 600-699 nm, and 10.4% of 400-499 nm, a peak wavelength was 519 nm in a band of 500-550 nm, and a full-width-at-half-maximum of a peak light wave was 27 nm.

Embodiment 4

Figure 4:
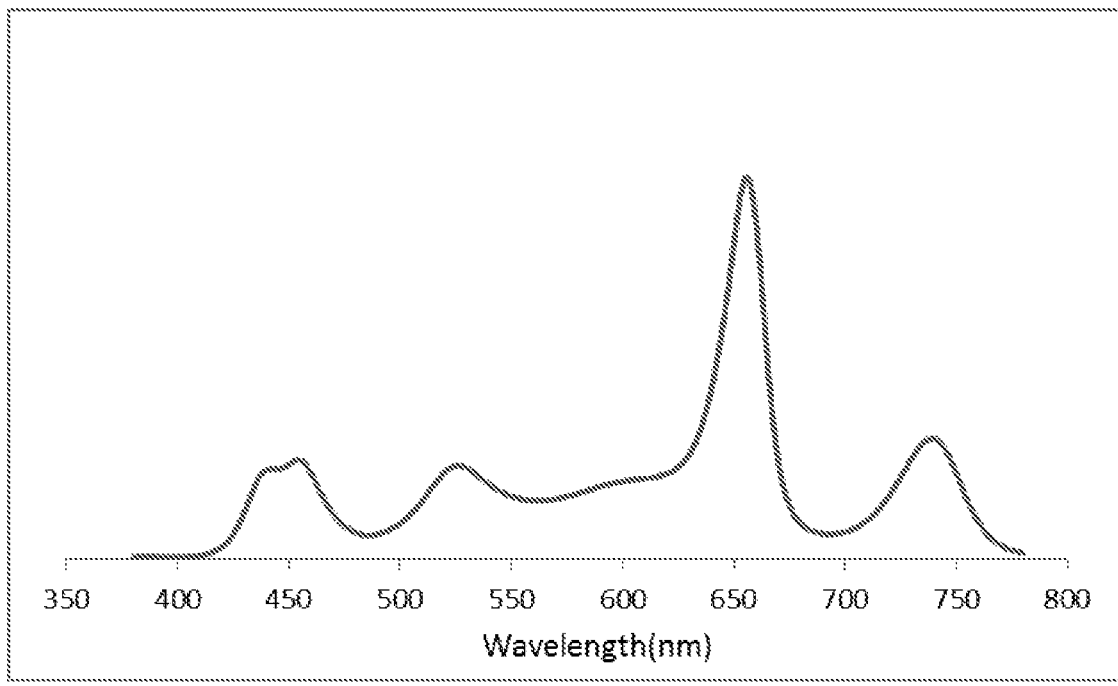
FIG. 4 is a spectral distribution diagram of an LED plant growth lamp used in Embodiment 4.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 4 is a spectral distribution diagram of the used LED plant growth lamp, where the light intensity was 200 μmol/$m^2$s to 1000 μmol/$m^2$s, the light period was 14 h, the spectral composition was: 21.2% of a light wave of 500-599 nm, 19.3% of a light wave of 700-780 nm, 47.8% of a light wave of 600-699 nm, and 11.7% of 400-499 nm, a peak wavelength was 523 nm in a band of 500-550 nm, and a full-width-at-half-maximum of a peak light wave was 35 nm.

Embodiment 5

Figure 5:
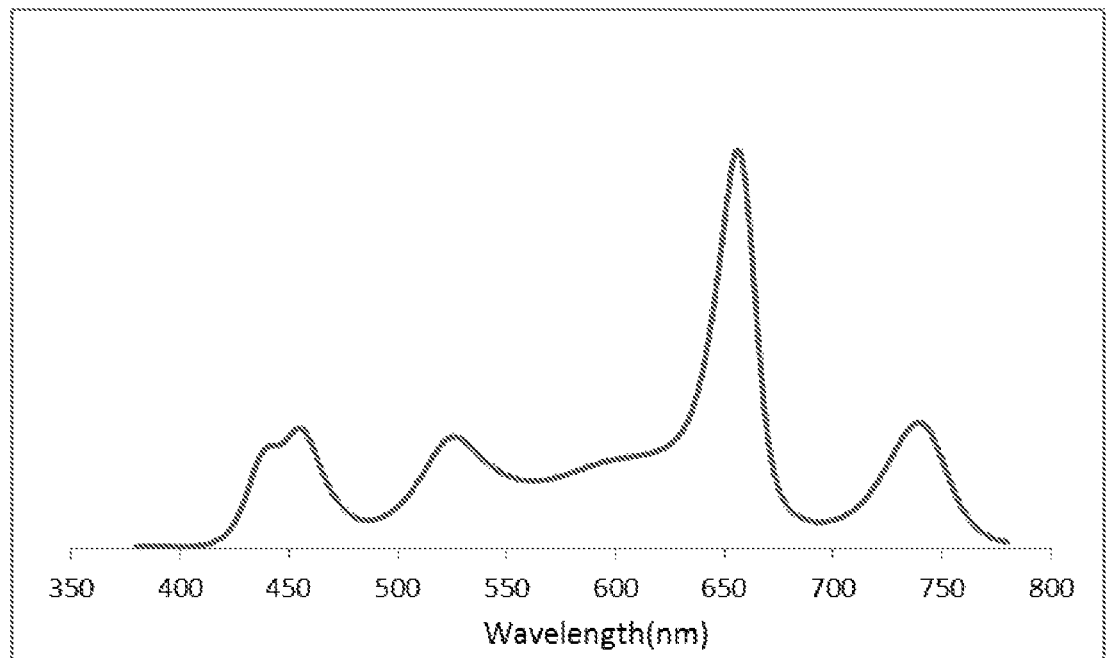
FIG. 5 is a spectral distribution diagram of an LED plant growth lamp used in Embodiment 5.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 5 is a spectral distribution diagram of the used LED plant growth lamp, where the light intensity was 200 μmol/$m^2$s to 1000 μmol/$m^2$s, the light period was 14 h, the spectral composition was: 22.6% of a light wave of 500-599 nm, 15.1% of a light wave of 700-780 nm, 49.3% of a light wave of 600-699 nm, and 13.0% of 400-499 nm, a peak wavelength was 526 nm in a band of 500-550 nm, and a full-width-at-half-maximum of a peak light wave was 30 nm.

Embodiment 6

Figure 6:
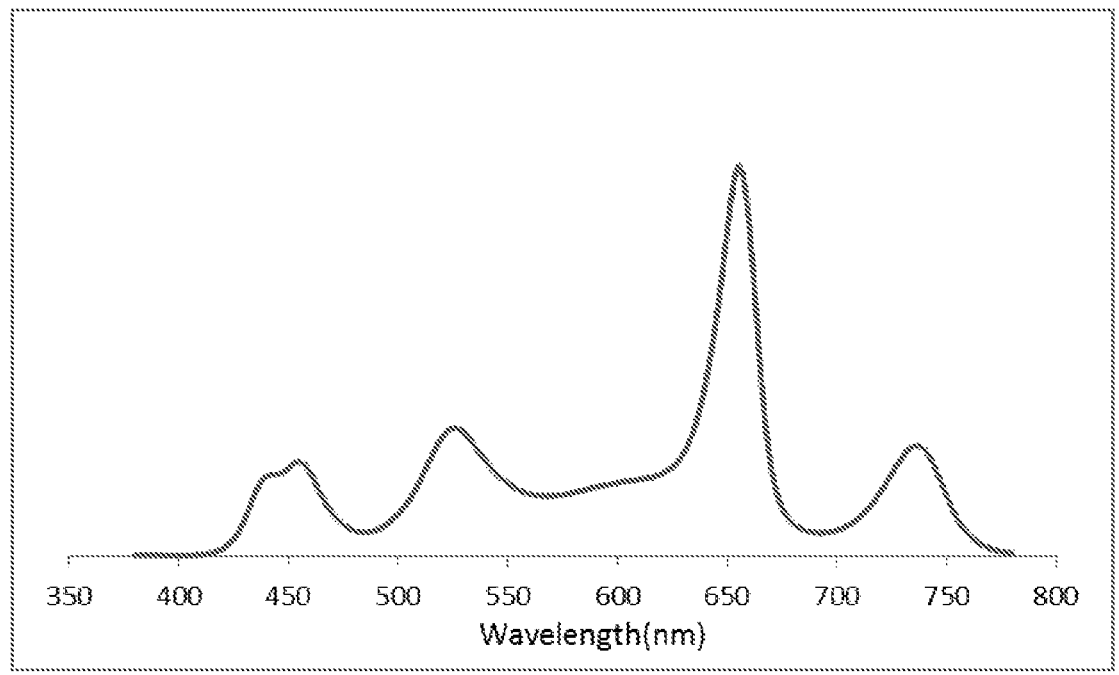
FIG. 6 is a spectral distribution diagram of an LED plant growth lamp used in Embodiment 6.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 6 is a spectral distribution diagram of the used LED plant growth lamp, where the light intensity was 200 μmol/m²s to 1000 μmol/m²s, the light period was 14 h, the spectral composition was: 24.7% of a light wave of 500-599 nm, 17.6% of a light wave of 700-780 nm, 47.0% of a light wave of 600-699 nm, and 10.7% of 400-499 nm, a peak wavelength was 520 nm in a band of 500-550 nm, and a full-width-at-half-maximum of a peak light wave was 27 nm.

Embodiment 7

Figure 7:
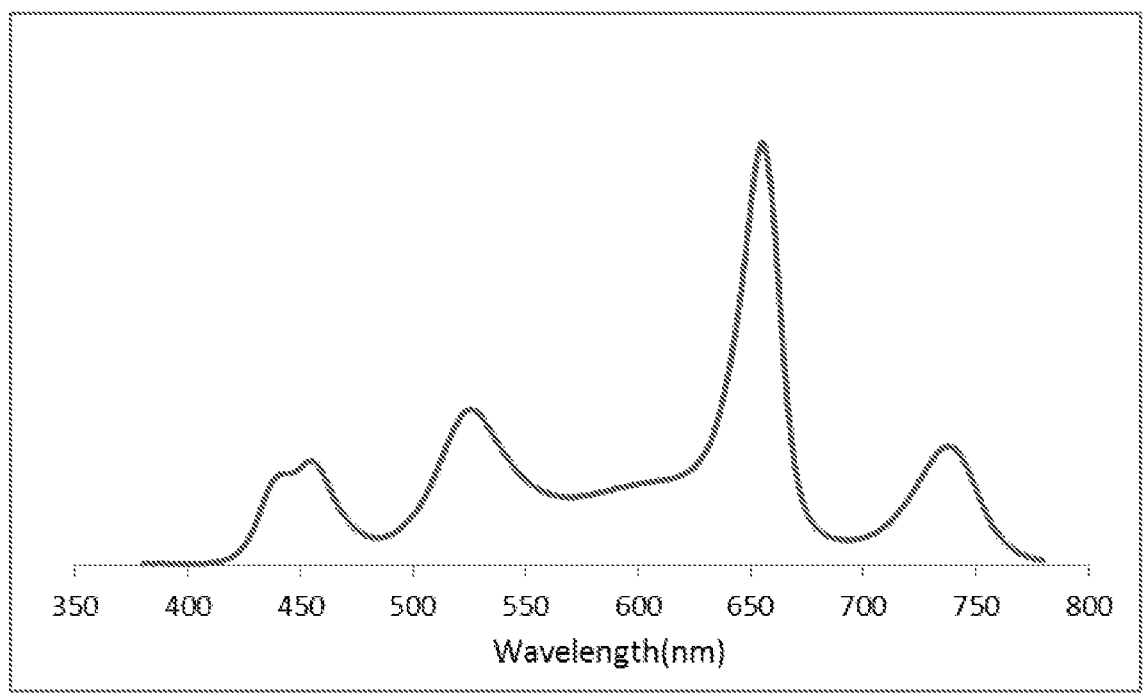
FIG. 7 is a spectral distribution diagram of an LED plant growth lamp used in Embodiment 7.

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, an LED plant growth lamp provided by the present invention was used to provide a light source. FIG. 7 is a spectral distribution diagram of the used LED plant growth lamp, where the light intensity was 200 μmol/m²s to 1000 μmol/m²s, the light period was 14 h, the spectral composition was: 25.9% of a light wave of 500-599 nm, 16.2% of a light wave of 700-780 nm, 47.0% of a light wave of 600-699 nm, and 10.9% of 400-499 nm, a peak wavelength was 520 nm in a band of 500-550 nm, and a full-width-at-half-maximum of a peak light wave was 27 nm.

Comparative Example

The cannabis seedlings with the better roots were transplanted into a substrate or a rock wool. Four plants are placed within one square meter. The ambient temperature was set to T=24-26° C. and the humidity was T=RH60-70%. When the height of plants was about 20 cm, the plants were topped for promoting the growth of lateral branches. When the lateral branches were grown for two weeks, the lateral branches were topped to obtain more lateral branches. After four weeks, reproductive growth is beginning. During the reproductive phase, a high pressure sodium (BPS) lamp was used to provide a light source. The light intensity was 200 μmol/m²s to 1000 μmol/m²s, the light period was 14 h, and the spectral composition was: 50.0% of a light wave of 500-599 nm, 7.9% of a light wave of 700-780 nm, 37.9% of a light wave of 600-699 nm, and 4.2% of 400-499 nm.

The content of tetrahydrocannabinol (THC) in cannabis cultivated by the cultivation methods described in Embodiments 1-7 and Comparative Example 1 was measured, and the results are shown in Table 1.

| | Peak wavelength in interval of 500-550 nm (nm) | Full-width-at-half-maximum of corresponding peak light wave in interval of 500-550 nm (nm) | Proportion of light wave of 500-599 nm (%) | Ratio of number of photons in range of 500-599 nm to number of photons in range of 700-780 nm | Ratio of number of photons of 600-699 nm to number of photons of 400-499 nm | THC content (%) |
|---|---|---|---|---|---|---|
| Comparative Example | — | — | 50 | 6.3 | 9.0 | 15.8 |
| Embodiment 1 | 510 | 29 | 19.2 | 0.9 | 4.5 | 22.9 |
| Embodiment 2 | 515 | 34 | 21.7 | 1.3 | 4.2 | 23.3 |
| Embodiment 3 | 519 | 27 | 23.6 | 1.4 | 4.7 | 24.0 |
| Embodiment 4 | 523 | 35 | 21.2 | 1.1 | 4.1 | 23.7 |
| Embodiment 5 | 526 | 30 | 22.6 | 1.5 | 3.8 | 23.1 |
| Embodiment 6 | 520 | 27 | 24.7 | 1.4 | 4.4 | 23.8 |
| Embodiment 7 | 520 | 27 | 25.9 | 1.6 | 4.3 | 23.2 |

It can be seen from Table 1 that the THC content in cannabis can be increased by 44-52% by the LED plant growth lamp provided by the present invention in comparison with the high pressure sodium lamp (BPS) while other growth conditions and light intensity are the same.

What is claimed is:

1. An LED plant growth lamp spectrum, comprising:
a first light wave having a wavelength of 500-599 nm, wherein photons of the first light wave account for 18-26% of all photons of the LED plant growth lamp spectrum;
a second light wave having a wavelength of 700-780 nm, wherein photons of the second light wave is from 17.6% to 20.2% of the all photons of the LED plant growth lamp spectrum;
a ratio of a number of the photons of the first light wave to a number of the photons of the second light wave is (0.9-1.6):1;
a third light wave having a wavelength of 600-699 nm, wherein photons of the third light wave is from 47.0% to 50.4% of the all photons of the LED plant growth lamp spectrum;
a fourth light wave having a wavelength of 400-499 nm, wherein photons of the fourth light wave is from 10.4% to 13.0% of the all photons of the LED plant growth lamp spectrum;
a ratio of a number of photons of the third light wave to a number of photons of the fourth light wave is 3.8-4.8:1;
a peak wavelength is between 510 and 527 nm in a band of 500-550 nm, and a full-width-at-half-maximum of a peak light wave is between 27 nm and 35 nm; and
the LED plant growth lamp spectrum is utilized for an LED plant growth lamp, the LED plant growth lamp has a same spectrum as the LED plant growth lamp spectrum; during a growth of a cannabis, the LED plant growth lamp has a light intensity ranging from 200 μmol/m²s to 1000 μmol/m²s and a light period equal to or less than 15 hours per day, thereby achieving a tetrahydrocannabinol (THC) content in the cannabis from 22.9 to 24%.

2. The LED plant growth lamp spectrum according to claim 1, wherein a peak wavelength of the first light wave is in a range of 510-526 nm in a band of 500-550 nm.

3. The LED plant growth lamp spectrum according to claim 1, wherein a peak wavelength of the second light wave is in a range of 730-740 nm in a band of 700-750 nm.

4. A method of using the LED plant growth lamp in an indoor cultivation of a cannabis according to claim 1, comprising the following step: using the LED plant growth lamp to promote an accumulation of cannabinoid secondary metabolites in the indoor cultivation of the cannabis.

5. The LED plant growth lamp spectrum according to claim 1, wherein a peak wavelength of the first light wave is in a range of 510-526 nm in a band of 500-550 nm.

6. The LED plant growth lamp spectrum according to claim 1, wherein a peak wavelength of the second light wave is in a range of 730-740 nm in a band of 700-750 nm.

7. The LED plant growth lamp spectrum according to claim 1, wherein
 photons of the first light wave account for 18.2% of all photons of the LED plant growth lamp spectrum;
 photons of the second light wave account for 20.2% of all photons of the LED plant growth lamp spectrum;
 photons of the third light wave account for 50.4% of all photons of the LED plant growth lamp spectrum;
 photons of the fourth light wave account for 11.2% of all photons of the LED plant growth lamp spectrum;
 the LED plant growth lamp has the light period equal to 14 hours per day; and
 the peak wavelength is 510 nm in the band of 500-550 nm, and the full-width-at-half-maximum of the peak light wave is 29 nm.

8. The LED plant growth lamp spectrum according to claim 1, wherein
 photons of the first light wave account for 21.2% of all photons of the LED plant growth lamp spectrum;
 photons of the second light wave account for 19.3% of all photons of the LED plant growth lamp spectrum;
 photons of the third light wave account for 47.8% of all photons of the LED plant growth lamp spectrum;
 photons of the fourth light wave account for 11.7% of all photons of the LED plant growth lamp spectrum;
 the LED plant growth lamp has the light period equal to 14 hours per day; and
 the peak wavelength is 515 nm in the band of 500-550 nm, and the full-width-at-half-maximum of the peak light wave is 34 nm.

9. The LED plant growth lamp spectrum according to claim 1, wherein
 photons of the first light wave account for 24.7% of all photons of the LED plant growth lamp spectrum;
 photons of the second light wave account for 17.6% of all photons of the LED plant growth lamp spectrum;
 photons of the third light wave account for 47.0% of all photons of the LED plant growth lamp spectrum;
 photons of the fourth light wave account for 10.9% of all photons of the LED plant growth lamp spectrum;
 the LED plant growth lamp has the light period equal to 14 hours per day; and
 the peak wavelength is 526 nm in the band of 500-550 nm, and the full-width-at-half-maximum of the peak light wave is 30 nm.

10. The LED plant growth lamp spectrum according to claim 2, wherein a full-width-at-half-maximum of a corresponding peak light wave in the band of 500-550 nm is less than 50 nm.

11. The LED plant growth lamp spectrum according to claim 5, wherein a full-width-at-half-maximum of a corresponding peak light wave in the band of 500-550 nm is less than 50 nm.

* * * * *